United States Patent [19]

Crisler et al.

[11] Patent Number: 5,038,342
[45] Date of Patent: Aug. 6, 1991

[54] TDM/FDM COMMUNICATION SYSTEM SUPPORTING BOTH TDM AND FDM-ONLY COMMUNICATION UNITS

[75] Inventors: Kenneth J. Crisler, Wheaton; Lawrence M. Mohl, Hoffman Estates; Michael D. Kotzin, Buffalo Grove, all of Ill.; Anthony P. Van den Heuvel, Parkland, Fla.

[73] Assignee: Motorola, Inc., Schaumburg, Ill.

[21] Appl. No.: 300,515

[22] Filed: Jan. 23, 1989

[51] Int. Cl.⁵ .................................................. H04J 4/00
[52] U.S. Cl. ...................................... 370/50; 370/95.1
[58] Field of Search ............... 370/50, 75, 97, 95, 370/85.7, 95.1

[56] References Cited

U.S. PATENT DOCUMENTS 4,510,598  4/1985  Göckler et al. ..................... 370/50
4,546,470 10/1985  Naylor et al. ....................... 370/97
4,549,303 10/1985  Gutleber ............................. 375/25
4,675,863  6/1987  Paneth et al. ....................... 370/50
4,713,809 12/1987  Mizota ................................ 370/97

FOREIGN PATENT DOCUMENTS 2124059  2/1984  United Kingdom ................. 370/50

Primary Examiner—Douglas W. Olms
Assistant Examiner—Melvin Marcelo
Attorney, Agent, or Firm—Steven G. Parmelee

[57] ABSTRACT

An RF communications system that can determine when a requesting subscriber unit comprises a TDM capable unit, and when it doesn't. Channel assignments are based upon this determination. The system also includes repeaters that can translate communications in a TDM format as transmitted by a TDM capable unit into non-TDM format for subsequent transmission to a non-TDM capable unit, and vice versa.

19 Claims, 2 Drawing Sheets

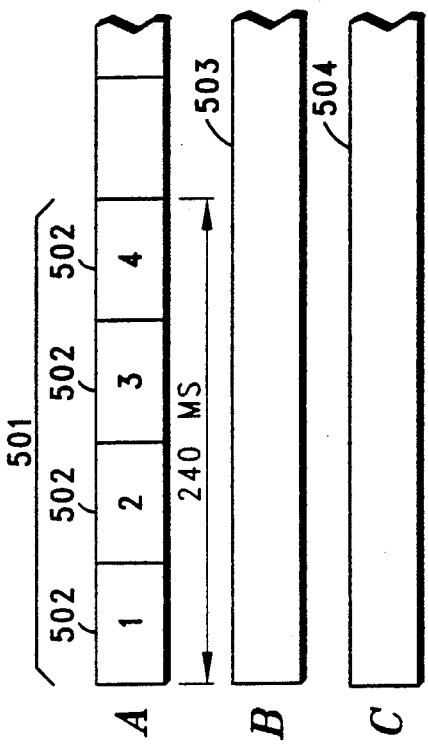
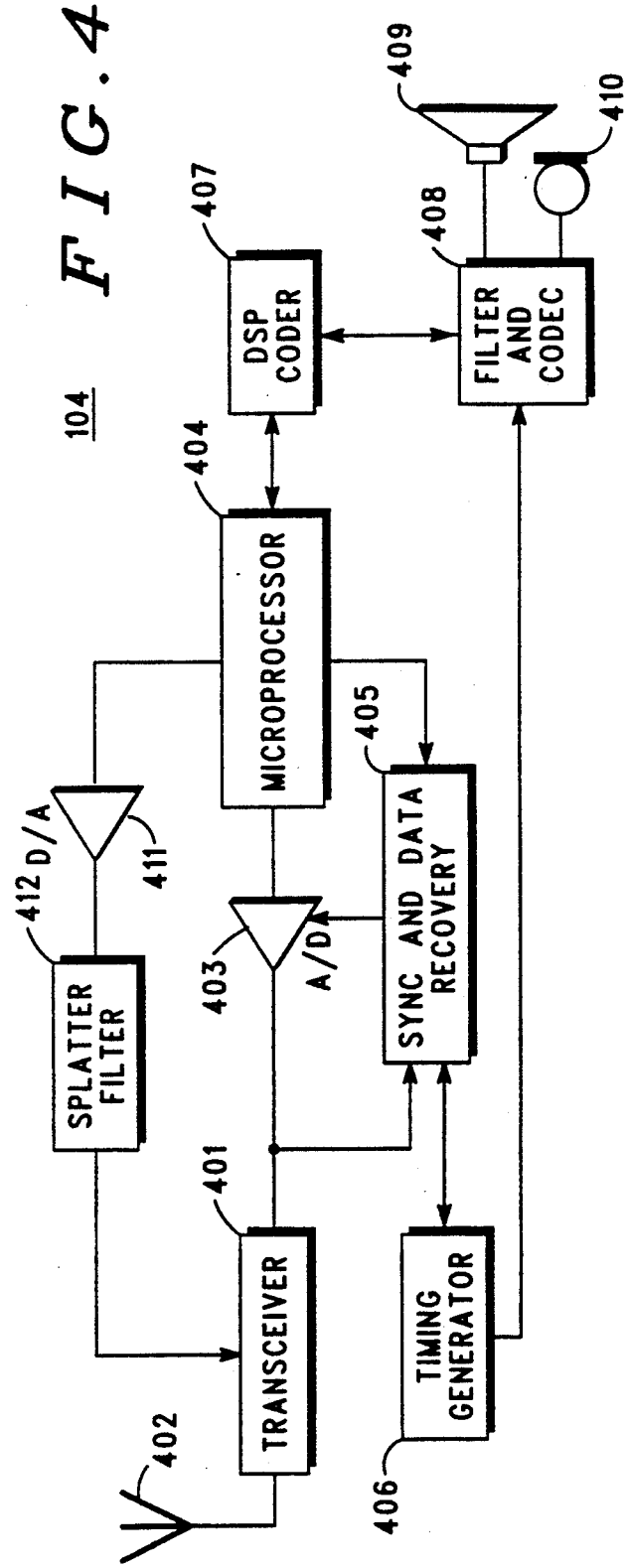

TDM/FDM COMMUNICATION SYSTEM SUPPORTING BOTH TDM AND FDM-ONLY COMMUNICATION UNITS

TECHNICAL FIELD

This invention relates generally to radio frequency communication systems.

BACKGROUND ART

Radio frequency (RF) communication systems that make use of frequency division multiplexing (FDM) are known. In such systems, commonly known as trunked communication systems, communication channels are assigned for use from time to time to subscribers as needed.

RF systems that make use of time division multiplexing (TDM) are also known. In these systems a communication frequency (or pair of frequencies) is divided by time into frames and slots, and subscribers are assigned a slot to support their communication needs.

Combined FDM/TDM systems are also known. In such systems, a subscriber will be assigned a particular time slot on a particular frequency (or pair of frequencies) to support its communication needs.

FDM/TDM systems offer a number of advantages versus FDM systems in regard to support for many desirable features. Additional information regarding these features and their implementation within an FDM/TDM system can be found in a commonly owned co-pending application U.S. Ser. No. 300,392 filed on even date herewith. Therefore, introduction of TDM into existing FDM systems is highly desirable.

It would be impractical, however, in many systems to immediately convert all current FDM-only users to TDM communications. A need exists for a communication system that will economically support communication needs of both FDM-only communication users and TDM communication users.

SUMMARY OF THE INVENTION

These needs are substantially met through provision of the time division multiplexed, multiple frequency communication system disclosed herein. This system supports a plurality of TDM frames on at least some of its multiple frequencies, wherein each TDM frame includes a plurality of time slots. Voice and data message communications are substantially supported by at least some of these time slots. This system also supports voice and data message communications in a non-TDM form on at least some of its multiple frequencies.

Both FDM/TDM communication units and FDM-only units may be accommodated in a single system. The system can determine whether a communication unit constitutes an FDM/TDM capable communication unit. Such a communication unit can then be assigned to a communication channel that supports TDM communications. If the communication unit does not constitute an FDM/TDM capable communication unit, then that unit can be assigned to a communication channel that supports non-time division multiplexed communications. Further, the system can be provided with the capability of receiving TDM format communications from an FDM/TDM capable communication unit and converting that communication to a non-time division multiplexed format such that it can be retransmitted in a useful format to a non-TDM capable communication unit. The reverse process is also provided.

BRIEF DESCRIPTION OF THE DRAWINGS

FIG. 3 comprises block diagram of a voice recovery block;

FIG. 4 comprises a block diagram depiction of an FDM/TDM capable subscriber unit;

FIG. 5 comprises a timing diagram depicting a three channel system.

BEST MODE FOR CARRYING OUT THE INVENTION

Figure 1:
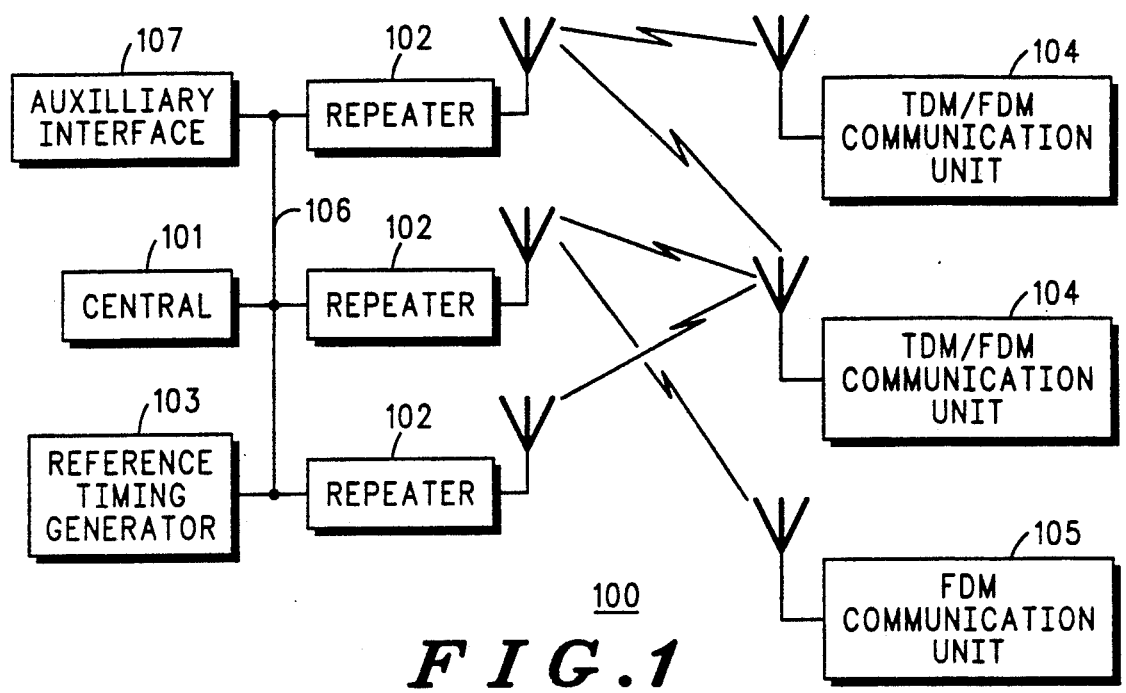
FIG. 1 provides a system block diagram.

Referring to FIG. 1, a system implementing the invention can be seen as generally depicted by the numeral 100. The system (100) includes generally a central controller (101) that controls the allocation of communication channels (frequencies and time slots) to promote organized communication between various communication units. The central controller (101) connects via appropriate interconnections, in a known manner, to a plurality of repeaters (102), there being one repeater (102) for each supported frequency (or frequency pair, depending upon the application). The central controller (101), coupled to the repeaters (102) as described, controls the operation of the repeaters (102) and provides control channel information as developed by the central controller (101). Each repeater (102) may include a microprocessor and associated digital circuitry, in which case the controlling actions of the central controller (101) may take the form of data packets transferred over an interconnecting network (106).

The system also includes a reference timing generator (103) and one or more auxiliary interface units (107). The timing generator, which may include a high stability reference oscillator, provides various clock signals, including but not limited to the TDM frame clock, slot clock, and data bit clock to the central controller (101) and the repeaters (102) to maintain time synchronization throughout the system, so that symbols, slots and frames on all TDM frequencies correspond properly in time. The auxiliary interfaces (107) provide means to interconnect the system (100) with non-RF communication units, such as telephone lines and dispatch consoles.

The system also includes a plurality of communication units, including TDM/FDM capable units (104) and FDM-only communication units (105). (As used herein, "communication unit" is intended to refer to any of a variety of radio platforms, including but not limited to mobile radios, portable radios, and fixed location radios including both one-way and two-way devices.)

Figure 2:
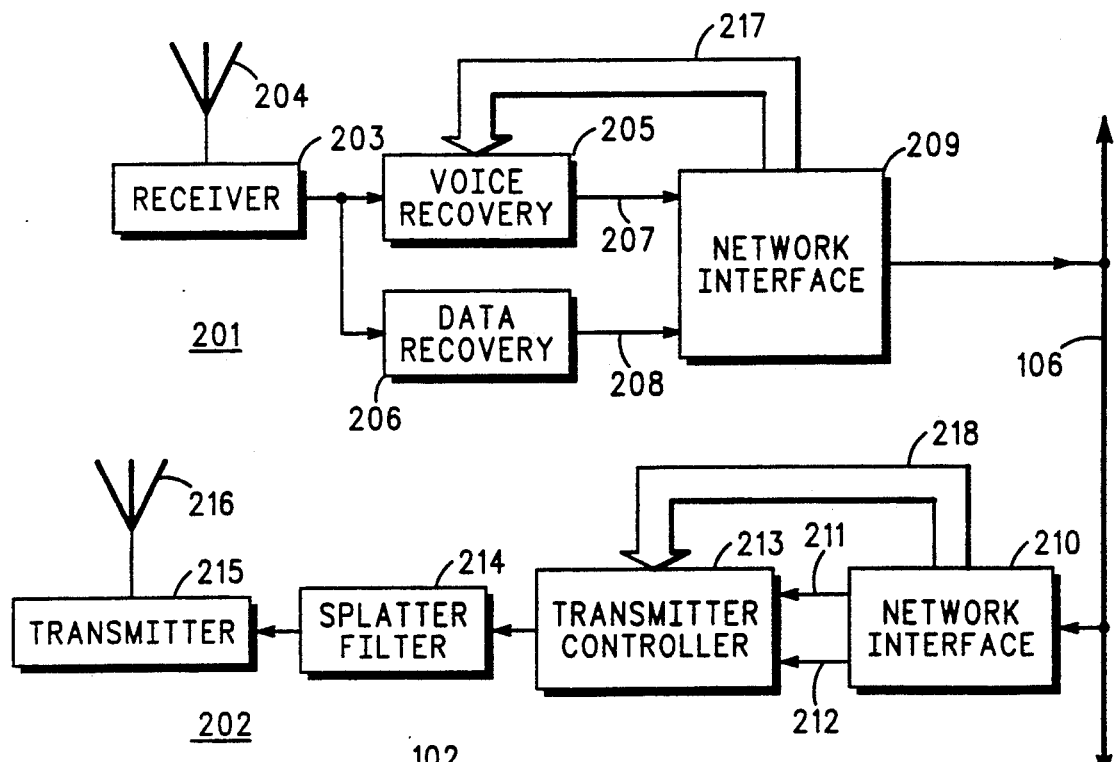
FIG. 2 comprises a block diagram depiction of a repeater.

Referring to FIG. 2, the repeater (102) will now be described. The repeater (102) includes a receive and a transmit section (201 and 202).

The receiver section (201) includes an RF receiver (203) that receives signals via an appropriate antenna structure (204) and that provides at its output a baseband signal. The latter signal is passed to both a voice recovery block (205) and a data recovery block (206). The voice recovery block processes the received baseband signal to recover the voice information signal (207). The data recovery block operates in a known manner to recover any data information (such as, for instance, control information) included in the received signal, thus providing the received data signal (208).

The recovered voice signal (207) and data signal (208) are passed to the repeater network interface (209), which communicates these to the central controller (101) or other repeaters (102) as is appropriate via the repeater interconnection network (106). In addition, the repeater network interface (209) provides control information (217) to the voice recovery block (205) as received from the central (101). So configured, the repeater (102) receives TDM/FDM RF signals and properly processes them to recover both voice and data information that may be present in the communication.

Referring momentarily to FIG. 3, the voice recovery block (205) will be further described. The received baseband signal (301) contains the voice information signal as transmitted by the subscriber unit. This signal might consist of the original audio signal when receiving from an FDM communication unit (105), or in the case of a TDM communication unit (104) the voice signal (207) might be some processed version of the original audio signal. An example of this audio processing can be found in a commonly owned co-pending application filed Apr. 29, 1988 and having U.S. Ser. No. 187,685.

The baseband signal (301) is sampled in the voice recovery block (205) by a sample (302). The sampled signal is digitized by an analog to digital converter (303) and the digitized samples are passed to a digital signal processor (304), for example, the Motorola DSP56000. The digital signal processor processes the sampled signal in order to change its form to that which is ap-propriate for use in the repeater interconnection network (106). In one embodiment, this form may be identical to that which is received from or transmitted to an FDM-only communication unit (105). In another embodiment, the repeater interconnection network may use an audio signal format identical to that of a TDM communication unit (104). In yet another embodiment, a third distinct form may be used as deemed appropriate for the repeater interconnection network (106).

Referring back to FIG. 2, the repeater transmitter section (202) includes a network interface (210) that receives voice signals (211), data signals (212), and system control information (218). The voice signals (211) comprise received voice signals (207) from the repeater's receiver section (201) or from the receiver sections (201) of other repeaters (102) in the system. The data signals (212) include control channel information from the central controller (101). The transmitter control information (218) comprises signals which control the processing of the voice signal (211) and the data signal (212) by the transmitter controller (213).

The voice signal (211) and data signal (212) are processed by the transmitter controller (213) to provide an appropriately coded and slot and frame synchronized signal at its output. As in the receiver section (201), the transmitter controller (213) includes a DSP to reformat the voice signal (211) as appropriate for various receiving communication units. The output of the transmitter controller (213) is passed through a splatter filter (214) to an RF transmitter (215) that properly processes the signal to provide a signal that may be appropriately radiated from an antenna device (216) to cause transmission of the processed signal as desired.

In one embodiment, the central (101) determines whether a communication unit constitutes an FDM/TDM capable communication unit (104) or an FDM-only communication unit (105). This is accomplished by way of inbound signalling words (ISWs) provided by communication units (104 or 105) when requesting a channel assignment via one or more channels dedicated to system control. These control channels may take the form of particular frequencies (FDM implementation), frequency and slot combinations (TDM implementation), or both as deemed appropriate by the system designer. The ISWs themselves comprise 21 data bits that are error encoded up to 78 symbols. The 21 data bits include 16 bits for the communication unit ID and 5 bits to indicate call type request. If desired, some of the ID bits or the call type request bits can be allocated in the system to identify whether a requesting unit is a TDM/FDM communication unit (104) or an FDM-only communication unit (105). In an alternate embodiment, an additional bit is added to the ISW to identify communication unit type. In yet another embodiment, the central (101) could compare the ID of the communication unit against a look-up table of unit types, and make the appropriate system configuration following type identification.

In another embodiment, each repeater (102) determines communication unit type based on data transmitted by the communication unit after assignment to the voice channel. For example, after assignment, a communication unit would transmit a data word identifying itself as an FDM-only unit or a TDM capable unit. This data would be received by the data recovery block (206) and interpreted by the network interface (209) in order to provide appropriate control of the voice recovery block (205).

Referring to FIG. 4, a TDM/FDM capable communication unit (104) will be described. The communication unit (104) includes an RF transceiver (401) that couples to an appropriate antenna (402) to transmit and receive RF signals. The transceiver (401) provides a received baseband signal which is digitized by an analog to digital converter (403). The output of the A/D converter is passed to a microprocessor, such as, for example, the Motorola MC68000 (404). The baseband signal is also passed to a sync and data recovery block (405) which processes the signal to establish frame and bit synchronization with the transmitting repeater (102). The communication unit also includes a clock generator (406) which provides certain timing signals as appropriate to support the TDM nature of the communications.

The microprocessor (404) processes the received signal and passes the audio information to a DSP coder (407), such as, for example, the Motorola DSP56000, which provides a coding/decoding function used in this embodiment to properly encode (or decode) the audio information in a particular form. (Again, additional information regarding this form of encoding and decoding can be found in a commonly owned co-pending application filed Apr. 29, 1988 and having U.S. Ser. No. 187,685.) In an alternate embodiment, the DSP (407) could also perform the functions provided by the microprocessor (404) and the sync and data recovery block (405), resulting in a reduction of hardware complexity. The code/decoder (407) couples through a filter and codec (408) to an appropriate speaker (409) and microphone (410) to allow received audio information to be rendered audible and to allow originating audio information to be processed and transmitted.

Audio information to be transmitted is passed from the DSP (407) to the microprocessor (404) where additional information appropriate for the TDM nature of the communications is added. The resulting signal, properly coded and slot and frame synchronized, is passed in a digitized form to the digital to analog converter (411). The output of the D/A converter (411) is passed through a splatter filter (412) to the RF transceiver (401) which properly processes the signal to provide a signal that may be appropriately radiated from an antenna device (402) to cause transmission of the processed signal as desired.

Referring to FIG. 5, the above described system functions in an FDM/TDM operating environment wherein at least two frequencies are available for the central (101) to assign for communication purposes, and where one or more of the frequencies are subdivided by time into frames and slots and one or more of the frequencies are not subdivided. In this particular embodiment, three channels A, B, and C are depicted, channel A having frames (501) of 240 milliseconds with four slots (502) per frame (each slot being 60 milliseconds). (While in the preferred embodiment described herein, each time slot is of uniform size, non-uniform slot sizes could be used.) Channel B (503) is an FDM communication channel and as such is not subdivided into frames. Channel C (504) is reserved as the control channel for the system.

Three basic forms of communication are supported by the system: between one or more FDM units, one or more TDM units, and between a mixture of FDM and TDM units. In the first case, an FDM communication unit (105) would request a channel assignment by transmitting an ISW on channel C (504). The central controller will assign this call to channel B which has been designated to support FDM communications. Likewise for the second case, a communication request from a TDM capable unit will be assigned a slot (401) on channel A which has been designated to support TDM communications.

In the last case, a TDM capable unit transmits a particular ISW indicating a request to communicate with an FDM-only unit. The central (101) assigns the TDM unit a transmit slot (401) on channel A, and the FDM unit is assigned to receive on channel B. At the repeater (102) supporting channel A, the voice recovery block (205) translates the TDM audio into a form appropriate for communication via the repeater interconnection network (106) to the repeater (102) supporting channel B. At this repeater, the transmitter controller (213) further translates the audio signal to the appropriate form for transmission to the FDM-only communication unit. The reverse communication path is also provided by similar means, as should be understood by those skilled in the art.

So configured, a communication unit (104 or 105) can request frequency and slot assignments via the control channels provided by the system. The central can then identify the type of the requesting communication unit (104 or 105) and the type of the communication unit (104 or 105) with which the first unit is requesting to communicate. Further, the central (101) can assign the requesting unit and the receiving unit appropriate frequency and slot assignments, so that any unit may communicate with any other unit in the system.

What is claimed is:

1. In a radio communication system having a plurality of communication channels, and further including a plurality of communication units, at least some but not all of which are capable of time division multiplexed (TDM) communications, a method of assigning communications resources to a communication unit, comprising the steps of:

(A) determining that a communication unit requires communication resources;
(B) determining whether said communication unit comprises a TDM capable communication unit, wherein the step of determining whether said communication unit comprises a TDM capable communication unit includes the step of examining an ID code for said communication unit;
(C) when said communication unit comprises a TDM capable communication unit, assigning said communication unit to a communication channel that is supporting time division multiplexed communications; and
(D) when said communication unit does not comprise a TDM capable communication unit, assigning said communication unit to a communication channel that is supporting non-time division multiplexed communications.

2. The method of claim 1, wherein the step of assigning said communication unit to a communication channel that is supporting non-time division multiplexed communications includes the step of assigning said communication unit to any of a plurality of frequency division multiplexed channels that are each supporting non-time division multiplexed communications.

3. The method of claim 1, wherein the step of determining that a communication unit requires communication resources includes the step of determining that the communication unit requires communication resources to support transmission of a voice message.

4. The method of claim 1, wherein the step of determining that a communication unit requires communication resources includes the step of determining that the communication unit resources of support transmission of a data message.

5. The method of claim 1, wherein the radio communication system includes a central controller, and;
the step of determining that a communication unit requires communications resources includes the step of receiving, at the central controller, a communication resource assignment request from a communication unit;
the step of assigning a communication channel that is supporting time division multiplexed communications includes the step of sourcing, from the central controller, a communication resource assignment;
the step of assigning a communication channel that is supporting non-time division multiplexed communications includes the step of sourcing, from the central controller, a communication resource assignment.

6. The method of claim 1, wherein the step of examining an ID code includes the step of obtaining the ID code from a communication resource assignment request as transmitted by the communication unit that requires communications resources.

7. The method of claim 1, wherein the radio communication system maintains both a TDM format control channel and a non-TDM format control channel.

8. The method of claim 7, wherein the step of determining that a communication unit requires communications resources includes the step of receiving a communications resource assignment request on at least one of the TDM format control channel and the non-TDM format control channel.

9. The method of claim 8, wherein the communications resource assignment request includes the ID code.

10. The method of claim 1, wherein the step of examining an ID code for said communication unit includes the step of comparing the ID code against look up table information.

11. In a radio communication system having a plurality of communication channels, and further including a plurality of communication units, at least some but not all of which are capable of time division multiplexed (TDM) communications, a method of assigning communications resources to a communication unit, comprising the steps of:

(A) determining that a communication unit requires communication resources;

(B) determining whether said communication unit comprises a TDM capable communication unit, wherein the step of determining whether said communication unit comprises a TDM capable communication unit includes the step of examining data transmitted by said communication unit on a system control channel;

(C) when said communication unit comprises a TDM capable communication unit, assigning said communication unit to a communication channel that is supporting time division multiplexed communications; and (D) when said communication unit does not comprise a TDM capable communication unit, assigning said communication unit to a communication channel that is supporting non-time division multiplexed communications.

12. The method of claim 11, wherein the step of assigning said communication unit to a communication channel that is supporting non-time division multiplexed communications includes the step of assigning said communication unit to any of a plurality of frequency division multiplexed channels that are each supporting non-time division multiplexed communications.

13. The method of claim 11, wherein the step of determining that a communication unit requires communication resources includes the step of determining that the communication unit requires communication resources to support transmission of a voice message.

14. The method of claim 11, wherein the step of determining that a communication unit requires communication resources includes the step of determining that the communication unit requires communication resources to support transmission of a data message.

15. The method of claim 11, wherein the radio communication system includes a central controller, and:

the step of determining that a communication unit requires communications resources includes the step of receiving, at the central controller, a communication resource assignment request from a communication unit;

the step of assigning a communication channel that is supporting time division multiplexed communications includes the step of sourcing, from the central controller, a communication resource assignment;

the step of assigning a communication channel that is supporting non-time division multiplexed communications includes the step of sourcing, from the central controller, a communication resource assignment.

16. The method of claim 11, wherein the step of examining the data includes the step of obtaining the data from a communication resource assignment request as transmitted by the communication unit that requires communications resources.

17. The method of claim 11, wherein the radio communication system maintains both a TDM format control channel and a non-TDM format control channel.

18. The method of claim 17, wherein the step of determining that a communication unit requires communications resources includes the step of receiving a communications resource assignment request on at least one of the TDM format control channel and the non-TDM format control channel.

19. The method of claim 18, wherein the communications resource assignment request includes the data.

* * * * *

UNITED STATES PATENT AND TRADEMARK OFFICE
CERTIFICATE OF CORRECTION

PATENT NO. : 5,038,342

DATED : AUGUST 6, 1991

INVENTOR(S) : KENNETH J. CRISLER ET AL.

It is certified that error appears in the above-identified patent and that said Letters Patent is hereby corrected as shown below:

In Col. 6, line 35, between the words "unit" and "resources" please insert --requires communication--.

In Col. 6, line 35, please delete the word "of" and insert thereat --to--.

Signed and Sealed this

Twenty-second Day of December, 1992

Attest:

DOUGLAS B. COMER

*Attesting Officer*  *Acting Commissioner of Patents and Trademarks*